US012650485B2

(12) United States Patent
Koo et al.

(10) Patent No.: US 12,650,485 B2
(45) Date of Patent: Jun. 9, 2026

(54) METHOD AND DEVICE FOR UWB COMMUNICATION

(71) Applicant: Samsung Electronics Co., Ltd., Suwon-si (KR)

(72) Inventors: Jonghoe Koo, Suwon-si (KR); Mingyu Lee, Suwon-si (KR); Hyunchul Kim, Suwon-si (KR); Moonseok Kang, Suwon-si (KR); Sehee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 17/841,134

(22) Filed: Jun. 15, 2022

(65) Prior Publication Data
US 2022/0404448 A1     Dec. 22, 2022

(30) Foreign Application Priority Data
Jun. 15, 2021     (KR) ......................... 10-2021-0077602

(51) Int. Cl.
*G01S 1/04* (2006.01)
*H04B 1/7163* (2011.01)

(52) U.S. Cl.
CPC .......... *G01S 1/0428* (2019.08); *H04B 1/7163* (2013.01)

(58) Field of Classification Search
CPC ...... G01S 1/0428; G01S 11/04; G01S 5/0009; G01S 3/14; G01S 13/0209; G01S 13/765;

H04B 1/7163; H04B 2201/71634; H04W 4/80; H04W 4/06; H04W 4/20; H04W 4/023; H04W 4/23; H04L 67/14
See application file for complete search history.

(56) References Cited

U.S. PATENT DOCUMENTS

| | | | |
|---|---|---|---|
| 10,142,778 B2 | 11/2018 | Banerjea | |
| 10,305,540 B2 | 5/2019 | Mclaughlin et al. | |
| 2019/0195981 A1* | 6/2019 | Ding | G01S 5/04 |
| 2019/0317177 A1 | 10/2019 | Ertan et al. | |
| 2020/0100283 A1* | 3/2020 | Naguib | G01S 11/06 |
| 2020/0355819 A1* | 11/2020 | Padaki | H04L 12/1868 |
| 2021/0136527 A1* | 5/2021 | Tadayon | G01S 5/0289 |
| 2022/0116739 A1* | 4/2022 | Yin | H04W 4/023 |

(Continued)

FOREIGN PATENT DOCUMENTS

| | | | |
|---|---|---|---|
| CN | 112822325 A | 5/2021 |
| KR | 10-2012-0119607 A | 10/2012 |
| WO | 2013/179195 A1 | 12/2013 |

(Continued)

OTHER PUBLICATIONS

ISO/IEC; International Standard; ISO/IEC 7816-5; Second edition; Identification cards—Integrated circuit cards—Part 5: Registration of application providers; Dec. 1, 2004.

(Continued)

*Primary Examiner* — Margaret G Webb
(74) *Attorney, Agent, or Firm* — Jefferson IP Law, LLP

(57) ABSTRACT
A method performed by a first ultra-wideband (UWB) device in a wireless communication is provided. The method includes configuring the first UWB device as an advertiser and transmitting a UWB message for advertisement, wherein the UWB message is used for measuring an angle of arrival (AoA).

12 Claims, 3 Drawing Sheets

(56)                    References Cited

U.S. PATENT DOCUMENTS

2022/0390541 A1*  12/2022  Chen ........................ G01S 5/04

FOREIGN PATENT DOCUMENTS

WO          2017/198037 A1    11/2017
WO      WO-2020086653 A1 *   4/2020    ........... G01S 5/0284

OTHER PUBLICATIONS

Dworkin; Recommendation for Block Cipher Modes of Operation: The CMAC Mode for Authentication; Computer Security; NIST Special Publication 800-38B; https://doi.org/10.6028/NIST.SP.800-38B; NIST; May 2005.
Lee et al.; Angle-of-Arrival Estimation for UWB Signals Clustered in Angle; IEEE; Apr. 10, 2006.
International Search Report with Written Opinion dated Sep. 20, 2022; International Appln. No. PCT/KR2022/008475.
IEEE SA Standards Association; IEEE Standard for Low-Rate Wireless Networks; IEEE Computer Society; Developed by the LAN/MAN Standards Committee; IEEE Std 802.15.4™-2020; (Revision of IEEE Std 802.15.4-2015); Jul. 23, 2020; New York, NY.
IEEE SA Standards Association; IEEE Standard for Low-Rate Wireless Networks; Amendment 1: Enhanced Ultra Wideband (UWB) Physical Layers (PHYs) and Associated Randing Techniques; IEEE Computer Society; Developed by the LAN/MAN Standards Committee; IEEE Std 802.15.4z™-2020; (Amendment to IEEE Std 802.15.4™-2020); Aug. 25, 2020; New York, NY.
Bradner; Key words for use in RFCs to Indicate Requirement Levels; Network Working Group; Request for Comments: 2119; BCP: 14; Category: Best Current Practice; Harvard University; Mar. 1997; Cambridge, MA.
Housley; Cryptographic Message Syntax (CMS); Network Working Group; Request for Comments: 5652; Obsoletes: 3852; Category: Standards Track; Vigil Security; Sep. 2009.
Chen; NIST Special Publication 800-108; Recommendation for Key Derivation Using Pseudorandom Functions (Revised); Division Information Technology Laboratory; Computer Security; U.S. Department of Commerce; Oct. 2009.
Dworkin; NIST Special Publication 800-38A 2001 Edition; Recommendation for Block Cipher Modes of Operation; Methods and Techniques; National Institute of Standards and Technology; Technology Administration; U.S. Department of Commerce; Computer Security; Gaithersburg, MD; Dec. 2001.
FIPS PUBS; Announcing the Advanced Encryption Standard (AES); Federal Information Processing Standards Publication 197; http://csrc.nist.gov/publications/; Nov. 26, 2001.
Fira; The Power to Be Precise; Fira Consortium UWB Phy Technical Requirements; Version 1.3.0-0.9r0; Jun. 2022.
Berners-Lee et al.; Uniform Resource Identifier (URI): Generic Syntax; Network Working Group; Request for Comments: 3986; STD: 66; Updates: 1738; Obsoletes: 2732, 2396, 1808; Category: Standards Track; Adobe Systems; Jan. 2005.
Extended European Search Report dated Sep. 20, 2024; European Appln. No. 22825313.4-1206 / 4335130 PCT/KR2022008475.

* cited by examiner

Configure first UWB device as advertiser ~410

Transmit UWB message for advertisement ~420

Configure second UWB device as observer ~510

Receive UWB message for advertisement ~520

METHOD AND DEVICE FOR UWB COMMUNICATION

CROSS-REFERENCE TO RELATED APPLICATION(S)

This application is based on and claims priority under 35 U.S.C. § 119(a) of a Korean patent application number 10-2021-0077602, filed on Jun. 15, 2021, in the Korean Intellectual Property Office, the disclosure of which is incorporated by reference herein in its entirety.

BACKGROUND

1. Field

The disclosure relates to ultra-wideband (UWB) communication. More particularly, the disclosure relates to a method and device for providing a UWB advertisement.

2. Description of Related Art

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoI environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of conventional information technology (IT) techniques and various industries.

As wireless communication systems evolve to provide various services, a need arises for a method for effectively providing such services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for initiating a service using a UWB advertisement and measuring an angle of arrival (AoA) using the advertisement.

Additional aspects will be set forth in part in the description which follows and, in part, will be apparent from the description, or may be learned by practice of the presented embodiments.

In accordance with an aspect of the disclosure, a method performed by a first ultra-wideband (UWB) device in a wireless communication is provided. The method includes configuring the first UWB device as an advertiser and transmitting a UWB message for advertisement, and wherein the UWB message is used for measuring an angle of arrival (AoA).

In accordance with another aspect of the disclosure, a method performed by a second ultra-wideband (UWB) device in a wireless communication is provided. The method includes configuring the second UWB device as an observer and receiving, from a first UWB device, a UWB message for advertisement, and wherein the UWB message is used for measuring an angle of arrival (AoA).

In accordance with another aspect of the disclosure, a first ultra-wideband (UWB) device in a wireless communication is provided. The device includes a transceiver and at least one processor electrically coupled with the transceiver, wherein the at least one processor is configured to configure the first UWB device as an advertiser, and transmit a UWB message for advertisement, and wherein the UWB message is used for measuring an angle of arrival (AoA).

In accordance with another aspect of the disclosure, a second ultra-wideband (UWB) device in a wireless communication is provided. The device includes a transceiver and at least one processor electrically coupled with the transceiver, wherein the at least one processor is configured to configure the second UWB device as an observer, and receive, from a first UWB device, a UWB message for advertisement, and wherein the UWB message is used for measuring an angle of arrival (AoA).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
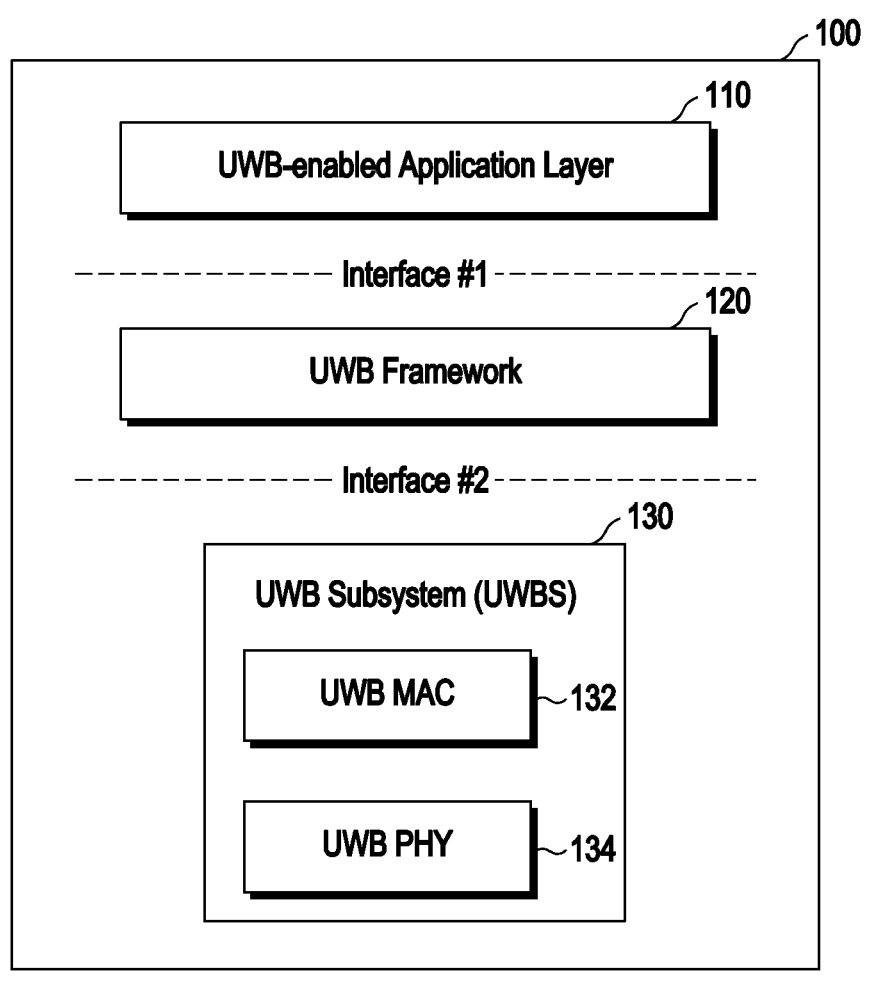
FIG. 1 illustrates an example architecture of a UWB device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments of the disclosure, a " . . . unit" may include one or more processors.

As used herein, the term 'terminal' or 'device' may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a machine to machine (M2M) terminal and a machine-type communication (MTC) terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure.

Hereinafter, embodiments of the disclosure are described in detail with reference to the accompanying drawings. Further, although a communication system using UWB is described in connection with embodiments of the disclosure, as an example, embodiments of the disclosure may also apply to other communication systems with similar technical background or features. For example, a communication system using Bluetooth (BLE) or ZigBee may be included therein. Further, embodiments of the disclosure may be modified in such a range as not to significantly depart from the scope of the disclosure under the determination by one of ordinary skill in the art and such modifications may be applicable to other communication systems.

When determined to make the subject matter of the disclosure unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and ultra-wide band (UWB). A wireless network in which such a wireless network technology is implemented may include a plurality of electronic devices.

According to the definitions by the Federal Communications Commission (FCC). UWB may refer to a wireless communication technology that uses a bandwidth of 500 MHz or more or a bandwidth corresponding to a center frequency of 20% or more. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure.

"Application dedicated file (ADF)" may be, e.g., a data structure in an application data structure that may host an application or application specific data.

"Application protocol data unit (APDU)" may be a command and a response used when communicating with the application data structure in the UWB device.

"Application specific data" may be, e.g., a file structure having a root level and an application level including UWB controllee information and UWB session data required for a UWB session.

"Controller" may be a ranging device that defines and controls ranging control messages (RCM) (or control messages).

"Controllee" may be a ranging device using a ranging parameter in the RCM (or control message) received from the controller.

Unlike "static STS," "dynamic scrambled timestamp sequence (STS) mode" may be an operation mode in which the STS is not repeated during a ranging session. In this mode, the STS may be managed by the ranging device, and the ranging session key that generates STS may be managed by a secure component.

"Applet" may be, e.g., an applet executed on the secure component including UWB parameters and service data. In this disclosure, Applet may be a FiRa Applet.

"Ranging Device" may be a device capable of performing UWB ranging. In the disclosure, the Ranging Device may be an Enhanced Ranging Device (ERDEV) defined in IEEE 802.15.4z. The Ranging Device may be referred to as a UWB device.

"UWB-enabled Application" may be an application for UWB service. For example, the UWB-enabled Application may be an application using a Framework API for configuring an out-of-band (OOB) Connector, a Secure Service, and/or a UWB service for a UWB session. In this disclosure, "UWB-enabled Application" may be abbreviated as an application or a UWB application. UWB-enabled Application may be a FiRa-enabled Application.

"Framework" may be a component that provides access to Profiles, individual-UWB settings and/or notifications. "Framework" may be, e.g., a collection of logical software components including Profile Manager, OOB Connector, Secure Service, and/or UWB service. In the disclosure, the Framework may be a FiRa Framework.

"OOB Connector" may be a software component for establishing an out-of-band (OOB) connection (e.g., BLE connection) between Ranging Devices. In the disclosure, the OOB Connector may be a FiRa OOB Connector.

"Profile" may be a previously defined set of UWB and OOB configuration parameters. In the disclosure, Profile may be a FiRa Profile.

"Profile Manager" may be a software component that implements a profile available on the Ranging Device. In the disclosure, the Profile Manager may be a FiRa Profile Manager.

"Service" may be an implementation of a use case that provides a service to an end-user.

"Smart Ranging Device" may be a ranging device that may implement an optional Framework API. In the disclosure, the Smart Ranging Device may be a FiRa Smart Device.

"Global Dedicated File (GDF)" may be a root level of application specific data including data required to establish a USB session.

"Framework API" may be an API used by a UWB-enabled Application to communicate with the Framework.

"Initiator" may be a Ranging Device that initiates a ranging exchange.

"Object Identifier (OID)" may be an identifier of the ADF in the application data structure.

"Out-Of-Band (OOB)" may be data communication that does not use UWB as an underlying wireless technology.

"Ranging Data Set (RDS)" may be data (e.g., UWB session key, session ID, etc.) required to establish a UWB session when it is needed to protect confidentiality, authenticity and integrity.

"Responder" may be a ranging device that responds to the Initiator in a ranging exchange.

"STS" may be a ciphered sequence for increasing the integrity and accuracy of ranging measurement timestamps. The STS may be generated from the ranging session key.

"Secure channel" may be a data channel that prevents overhearing and tampering.

"Secure Component" may be an entity (e.g., SE or TEE) having a defined security level that interfaces with UWBS for the purpose of providing RDS to UWBS, e.g., when dynamic STS is used.

"Secure element (SE)" may be a tamper-resistant secure hardware component that may be used as a Secure Component in the Ranging Device.

"Secure Ranging" may be ranging based on STS generated through a strong encryption operation.

"Secure Service" may be a software component for interfacing with a Secure Component, such as a Secure Element or Trusted Execution Environment (TEE).

"Service Applet" may be an applet on a Secure Component that handles service specific transactions.

"Service Data" may be data defined by a service provider that needs to be transferred between two ranging devices to implement a service.

"Service Provider" may be an entity that defines and provides hardware and software required to provide a specific service to an end-user.

"Static STS mode" is an operation mode in which STS is repeated during a session, and does not need to be managed by the Secure Component.

"Secure UWB Service (SUS) Applet" may be an applet on the SE that communicates with the applet to retrieve data needed to enable secure UWB sessions with other ranging devices. The SUS Applet may transfer corresponding data (information) to the UWBS.

"UWB Service" may be a software component that provides access to the UWBS.

"UWB Session" may be a period from when the Controller and the Controllee start communication through UWB until the communication stops. A UWB Session may include ranging, data transfer, or both ranging and data transfer.

"UWB Session ID" may be an ID (e.g., a 32-bit integer) that identifies the UWB Session, shared between the controller and the controller.

"UWB Session Key" may be a key used to protect the UWB Session. The UWB Session Key may be used to generate the STS. In this disclosure, the UWB Session Key may be a UWB Ranging Session Key (URSK), and may be abbreviated as a session key.

"UWB Subsystem (UWBS)" may be a hardware component implementing the UWB PHY and MAC layers specifications. UWBS may have an interface to Framework and an interface to Secure Component to search for RDS.

"Scheduled-based ranging" may be used for the ranging round scheduled by the controller for the controllees to transmit RFRAMEs and/or measurement reports in different ranging slots. In this disclosure, scheduling-based ranging may be referred to as time-scheduled ranging. A scheduling mode in which scheduling-based ranging is used may be referred to as a time-scheduled mode.

"Contention-based ranging" may be used when the controller does not know the MAC addresses of controllees participating in the UWB session (ranging session). In contention-based ranging, the controller may be an initiator and may perform ranging with other unknown UWB devices. In this disclosure, the scheduling mode in which contention-based ranging is used may be referred to as a contention-based mode.

The contention-based ranging may be used for the ranging round in which the controller determines the size of the contention access period and indicates the contention access period (CAP) size through a ranging control message. In this disclosure, the contention access period may be referred to as a contention window or a contention window period.

In the contention-based mode, the UWB device may operate as a controller and an initiator, and in this case, the ranging control phase (RCP) and the ranging initiation phase (RIP) may be merged into the RIP. In the ranging phase (RP), the allocation of the CAP size may determine the CAP period for the responder(s) participating in the corresponding ranging round in units of ranging slots. Each responder may randomly determine one slot in the CAP to transmit a ranging response message (RRM). Messages used in contention-based ranging may use SP1 as an RFRAME configuration.

"Hybrid ranging" may be used when there is a known controllee and an unknown controllee. As described above, the known controllee may be a controllee whose media access control (MAC) address is known to the controller, and the unknown controllee may be a controllee whose MAC address is not known to the controller. In this disclosure, hybrid ranging may be referred to as hybrid-based ranging. The scheduling mode in which hybrid ranging is used may be referred to as a hybrid-based mode.

In the hybrid-based mode, the controller may perform ranging with the known controllee in the scheduling-based mode and with the unknown controllee in the contention-based mode.

In the hybrid-based mode, the ranging round may include a ranging control phase (RC)P and a ranging phase (RP). The RP may include a contention free period for scheduling-based ranging (access) and a contention access period (CAP) for contention-based ranging (access). In the disclosure, the control message (ranging control message) used in the RCP of the hybrid-based mode may be referred to as a ranging management message (RMM).

"UWB message" may be a message including a payload IE transmitted by the UWB device (e.g., ERDEV). The UWB message may be such a message as, e.g., ranging initiation message (RIM), ranging response message (RRM), ranging final message (RFM), control message (CM), measurement report message (MRM), ranging result report message (RRRM), control update message (CUM) or one-way ranging (OWR) message. If necessary, a plurality of messages may be merged into one message.

"Payload IE" may be referred to as a payload information element and may be included in the MAC payload of the UWB MAC frame defined in IEEE 802.15.4/4z. The MAC payload may include a plurality of payload IEs.

"Data Message IE (Data Message Payload IE)" may be an additional payload IE for transmitting application data. Application data may be data transferred from a framework or application above the UWB MAC Layer.

The Data Message IE may be used in a two-way ranging (TWR) procedure. In this case, the ranging message (UWB message) may include at least one or both of the payload IE for ranging and the Data Message IE for application data transfer. For example, the Data Message IE may be included and transmitted as part of the payload IE of the MAC payload of a ranging initiation message (RIM) for ranging, a ranging response message (RRM), a ranging final message (RFM), a measurement report message (MRM) and ranging result report message (RRRM).

The Data Message IE may be used in a one-way ranging (OWR) procedure for angle of arrival (AoA) measurement. In this case, the AoA measurement message may include at least one or both of the payload IE for AoA measurement and the Data Message IE for application data transfer. For example, the Data Message IE may be included and transferred as a part of the payload IE of the MAC payload of the AoA measurement message.

"OWR" may be a ranging scheme using messages unilaterally transmitted between a ranging device and one or more other ranging devices. OWR may be used to measure the time difference of arrival (TDoA). Additionally, OWR may be used to measure AoA at the receiving end, rather than measuring TDoA. In this case, a pair of advertiser and observer may be used. OWR for AoA measurement may enable Observer to receive the OWR message from Advertiser and to measure AoA to determine the user's intention, action, or motion. For example, the user's intention to control a particular Advertiser may be verified by the results of AoA measurements on OWR messages from the Advertiser. In the disclosure. OWR may also be referred to as UWB OW R.

"Advertiser" is a ranging device that transmits the AoA measurement message. Advertiser may include the application data (application payload data) as part of the MAC payload of the AoA measurement message using the data message IE. The application data may be set by an upper layer. In this disclosure, Advertiser may be referred to as an Advertiser device or a UWB Advertiser device. In this disclosure, the AoA measurement message may also be referred to as an OWB message for AoA measurement, a UWB OWR message for AoA measurement, a UWB advertisement message, or an advertisement message.

"Observer" is a ranging device that receives the AoA measurement message and measures the AoA for each message. Observer may transmit the measured AoA to the upper layer. When the application data is included in the MAC payload of the AoA measurement message, Observer may transmit it to the upper layer. In the disclosure, Observer may be referred to as an Observer device or a UWB Observer device.

"TWR" may be a ranging scheme capable of estimating a relative distance between two devices by measuring time of flight (ToF) through the exchange of ranging messages between the two devices. The TWR scheme may be one of double-sided two-way ranging (DS-TWR) and single-sided two-way ranging (SS-TWR). SS-TWR may be a procedure for performing ranging through one round-trip time measurement. DS-TWR may be a procedure for performing ranging through two round-trip time measurements. For example, DS-TWR may include a RIM transmission operation from the initiator to the responder, an RRM transmission operation from the responder to the initiator, and an RRM transmission operation from the initiator to the responder. Meanwhile, during the TWR process, the measured AoA information (e.g., AoA azimuth result, AoA elevation result) may be transferred to another ranging device through RRRM or other messages. In the disclosure, TWR may also be referred to as UWB TWR.

"AoA" is the angle of arrival of a reception signal, and may be expressed as a relative angle, such as AoA azimuth and AoA elevation. Meanwhile, it may be assumed that the measuring device is a mobile phone with a display, the Y axis is the vertical display axis of the phone, the X axis is the horizontal display axis of the phone, and the Z axis is perpendicular to the phone display. In this case, the AoA azimuth angle may be a relative angle between the input signal projected on the XZ plane and the Z axis, and the AoA elevation angle may be a relative angle between the input signal and the XZ plane.

In the case of TWR, the controller (initiator) may measure the AoA azimuth for RRM, and may transmit the measured AoA azimuth through the UWB Command Interface (UCI) notification message. The controllee (responder) may measure the AoA azimuth for the RIM message, and may transmit the measured AoA azimuth through the RRRM.

In the case of TWR, the controller (initiator) may measure the AoA elevation for the RRM, and may transmit the measured AoA elevation through the UCI notification message. The controllee (responder) may measure the AoA elevation for the RIM message, and may transmit the measured AoA elevation through the RRRM.

In the case of OWR, the observer may measure AoA azimuth and AoA elevation for AoA measurement messages.

When determined to make the subject matter of the disclosure unclear, the detailed description of the known art or functions may be skipped.

Hereinafter, various embodiments of the disclosure are described with reference to the accompanying drawings.

FIG. 1 illustrates an example of an electronic device for UWB advertisement according to an embodiment of the disclosure.

The electronic device 100 of FIG. 1 may be a UWB electronic device. For example, the electronic device 100 may be the Advertiser or Observer described herein. As described above, the Advertiser may be a device that transmits (or broadcasts) the Advertisement Message, and the Observer may be a device that receives the Advertisement Message transmitted by the Advertiser.

Referring to FIG. 1, the electronic device may include a UWB-enabled application layer 110, a UWB framework 120, and/or a UWBS 130 including a UWB MAC layer 132 and a UWB physical layer 134. According to an embodiment, some enmities may not be included in the electronic device, or additional entities (e.g., a security component and/or an out-of-band (OOB) component) may be further included.

The UWB framework 120 may support at least one of a function for UWB ADVERTISEMENT, a function for UWB ranging and transaction execution, a function to provide an interface to the UWB-enabled application layer 110 and UWBS 130, or a function to estimate the location of a device.

The interface between the UWB framework 120 and the UWB-enabled application layer 110 may be referred to as a first interface (Interface #1). In an embodiment, the first interface may be a Framework API or a proprietary interface, but is not limited thereto.

The interface between the UWB framework 120 and the UWBS 130 may be referred to as a second interface (Interface #2). In an embodiment, the second interface may be a UWB Command Interface (UCI) or proprietary interface, but is not limited thereto.

The UWB-enabled application layer (or application) 110 may communicate with the UWB framework 120 through the first interface (e.g., Framework (application programming interface (API))). Thus, the UWB-enabled application layer 110 may use predetermined performance/functions through the first interface. For example, the UWB-enabled application layer 110 may support at least one of a function for UWB ADVERTISEMENT, service discovery, a UWB session configuration trigger function, or a ranging notification function.

Meanwhile, in the disclosure, UWB-enabled application layer 110 and/or UWB framework 120 may be implemented by an application processor (AP) (or processor). Accordingly, in the disclosure, the operation of the UWB-enabled application layer 110 and/or the UWB framework 120 may be understood as performed by an AP (or a processor). In this disclosure, the framework may be referred to as an AP or a processor.

The UWB subsystem (component) (UWBS) 130 may be used to communicate with another electronic device to perform at least one of a function for UWB ADVERTISEMENT, a function for UWB ranging and transaction, or a function for location estimation. For example, the UWBS 130 may communicate with the UWB subsystem of another device to transmit or receive the aforementioned UWB message (e.g., Advertisement Message).

The UWBS 130 may communicate with the UWB framework 120 through the second interface (e.g., UCI). In an embodiment, the UWB framework 120 (or application processor) (or host) may transmit a command through UCI, and the UWBS 130 may transmit a response to the command to the UWB framework 120. The UWBS 130 may transfer a notification to the UWB framework 120 through the UCI. For example, the UWB framework 120 may transmit a command (e.g., SET_ADVERTISEMENT_DATA_CMD) for setting advertisement data for UWB ADVERTISEMENT to the UWBS 130 through UCI. For example, the UWB framework 120 may transmit UWB configuration parameters and/or application configuration parameters to the UWBS 130 through UCI. For example, the UWBS 130 may send, e.g., a RANGE_DATA_NTF notification to the UWB framework 120.

Figure 2:
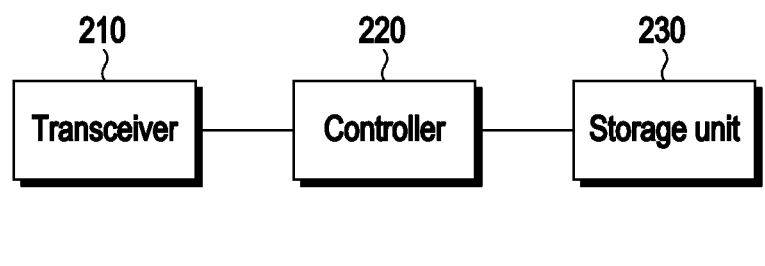
FIG. 2 is a view illustrating a structure of an advertiser according to an embodiment of the disclosure.

FIG. 2 is a view illustrating a structure of an advertiser according to an embodiment of the disclosure.

In the embodiment of FIG. 2, the Advertiser (or Advertiser device) may be a UWB electronic device. The Advertiser may correspond to the electronic device of FIG. 1, include the electronic device of FIG. 1, or may be an electronic device that may include part of the electronic device of FIG. 1. The Advertiser may be a device that transmits or broadcasts an Advertisement message to the Observer.

Referring to FIG. 2, the Advertiser may include a transceiver 210, a controller 220, and a storage unit 230. In the disclosure, the controller may be defined as a circuit or application-specific integrated circuit or at least one processor. The transceiver 210, the controller 220, and the storage unit 230 need not necessarily be included, and according to implementation, only at least one unit may be included.

The transceiver 210 may transmit/receive a signal to/from another entity or device. The transceiver 210 may transmit/receive data to/from another device through, e.g., UWB communication and/or OOB communication (e.g., BLE). For example, the transceiver 210 may transmit (broadcast) a UWB message (e.g., an Advertisement Message) to the Observer through UWB communication.

The controller 220 may control the overall operation of the electronic device according to an embodiment. For example, the controller 220 may control the signal flow between the blocks to perform the above-described operation for UWB ADVERTISEMENT. Specifically, the controller 220 may control, e.g., an operation for setting parameters for UWB ADVERTISEMENT (e.g., setting UWB configuration parameters and/or Application Configuration Parameters) and/or an operation for generating and transmitting a UWB message.

The storage unit 230 may store at least one of information transmitted/received via the transceiver 210 and information generated via the controller 220. For example, the storage unit 230 may store information and data necessary for, e.g., UWB ADVERTISEMENT.

Figure 3:
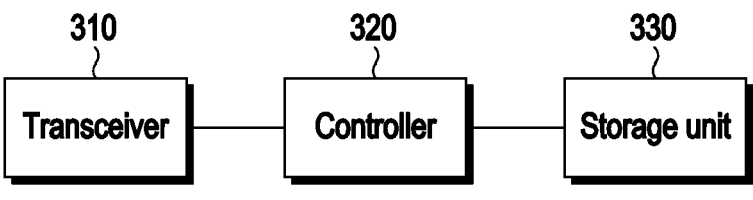
FIG. 3 is a view illustrating a structure of an observer according to an embodiment of the disclosure.

FIG. 3 is a view illustrating a structure of an observer according to an embodiment of the disclosure.

In the embodiment of FIG. 3, the Observer (or Observer device) may be a UWB electronic device. The Observer may correspond to the electronic device of FIG. 1, include the electronic device of FIG. 1, or may be an electronic device that may include part of the electronic device of FIG. 1. The Observer may be a device that receives the advertisement message transmitted or broadcast by the Advertiser.

Referring to FIG. 3, the Observer may include a transceiver 310, a controller 320, and a storage unit 330. In the disclosure, the controller may be defined as a circuit or application-specific integrated circuit or at least one processor. The transceiver 310, the controller 320, and the storage unit 330 need not necessarily be included, and according to implementation, only at least one unit may be included.

The transceiver 310 may transmit and receive signals to/from another entity. The transceiver 310 may transmit/receive data to/from another device through, e.g., UWB communication and/or OOB communication (e.g., BLE). For example, the transceiver 310 may receive the UWB message (e.g., an Advertisement Message) from the Advertiser through UWB communication.

The controller 320 may control the overall operation of the electronic device according to an embodiment. For example, the controller 320 may control the signal flow between the blocks to perform the above-described operation for UWB ADVERTISEMENT. Specifically, the controller 320 may control, e.g., an operation for receiving and processing the UWB message (e.g., an Advertisement Message). In an embodiment, the controller 320 may perform at least one operation (e.g., service discovery, parameter setting, location estimation, UWB ranging/transaction, etc.) based on the Advertisement Message.

The storage unit 330 may store at least one of information transmitted/received via the transceiver 310 and information generated via the controller 320. For example, the storage unit 330 may store information and data necessary for, e.g., UWB ADVERTISEMENT.

Hereinafter, various embodiments of the UWB advertisement are described.

For UWB advertisement, the advertiser and observer may be configured/contained as one of device types (or device roles). The advertiser may be a device that transmits (or broadcasts) an advertisement message, and the observer may be a device that receives the advertisement message transmitted by the advertiser. According to an embodiment, the Advertiser may have the structure of the Advertiser of FIGS. 1 to 2. The Observer may have the structure of the Observer of FIGS. 1 and 3. In the disclosure, the UWB device configured as the advertiser may be referred to as a first UWB device, and the UWB device configured as the observer may be referred to as a second UWB device.

The UWB device may transmit/receive UWB messages. For example, the first UWB device may transmit (or broadcast) a UWB message that is an advertisement message, and the second UWB device may receive the UWB message.

According to an embodiment, the UWB message may include at least one of a Header IE or a Payload IE. An example of the Header IE may be configured in the form shown in Table 1 below.

TABLE 1

| Parameter | Size (bits) | Notes |
| --- | --- | --- |
| Length | 7 | Size of Content field |
| Element ID | 8 | 0 = Vendor Specific Header IE |
| Type | 1 | 0 = Header IE |
| Content | Variable | UWB message content |

Referring to Table 1, the Header IE of the UWB message may include a length field indicating the size of the content field, an element ID field indicating the identifier of the element, a TYPE field indicating the type, and/or a Content field including the UWB message content.

An example of the Payload IE may be configured in the form shown in Table 2 below.

|

TABLE 2

| Parameter | Size (bits) | Notes |
|---|---|---|
| Length | 11 | Size of Content field |
| Group ID | 4 | 2 = Vendor Specific Nested IE |
| Type | 1 | 1 = Payload IE |
| Content | Variable | UWB message content |

Payload IE may include a length field indicating the size of the content field, a group ID field indicating the identifier of the group, a type field indicating being the Payload IE, and/or a Content field including UWB message content.

The UWB message IDs may be defined in Table 3 for each UWB Messages. There could be multiple types for each UWB messages and what type will be used for each UWB messages should be specified via a Common Service and Management (CSM) layer.

TABLE 3

| UWB message ID | UWB Message | Format subclause |
|---|---|---|
| 0x0 | Ranging Initiation Message | section 5.9.1 |
| 0x1 | Ranging Response Message | section 5.9.2 |
| 0x2 | Ranging Final Message | section 5.9.3 |
| 0x3 | Control message | section 5.9.4 |
| 0x4 | Measurement report message | section 5.9.5, section 5.9.6 |
| 0x5 | Ranging result report message | section 5.9.7 |
| 0x | Control Update Message | section 5.9.8 |
| 0x7 | Advertisement Message | Section 5.9.9 |
| 0x7~0xF | Reserved for other UWB messages | N/A |

Referring to Table 3, UWB Message may include Ranging Initiation Message, Ranging Response Message, Ranging Final Message, Control message, Measurement report message, Ranging result report message, Control Update Message, Advertisement Message, and Reserved for other UWB messages.

The Advertisement Message may be a UWB Message for UWB Advertisement. The Advertisement Message may be used to measure angle-of-arrival (AoA). In this disclosure, the Advertisement Message may be referred to as an AoA measurement message. Or, the Advertisement Message may be referred to as a one way ranging (OWR) message.

According to an embodiment, the frame structure of the Advertisement Message may be configured as shown in Table 4.

TABLE 4

| Octets: 2 | 2/8 | 0/2/8 | variable | variable | 2/4 |
|---|---|---|---|---|---|
| Frame Control | Source Address | Destination Address | Header IE | Payload IE | FCS |
| | MAC header | | | MAC payload | MAC footer |

Referring to Table 4. MAC header of Advertisement Message may include at least one of frame control field, source address field, destination address field, or header IE field. MAC payload of Advertisement Message may include at least one Payload IE field. MAC footer of Advertisement Message may include Frame Checking Sequence (FCS) field. According to an embodiment, when the UWB message is an Advertisement message, the destination address field may not be used.

The Frame control field may include the format shown in Table 5.

TABLE 5

| Field | Size (bits) | Notes |
|---|---|---|
| Frame Type | 3 | 0b001: Data |
| Security Enabled | 1 | 0b0: Auxiliary Security Header is not present |
| Frame Pending | 1 | 0b0: No pending frame for the recipient |
| AR | 1 | 0b0: No ACK frame is required |
| PAN ID Compression | 1 | 1: Destination PAN ID field and Source PAN ID field are not present |
| Reserved | 1 | 0b0 |
| Sequence Number Suppression | 1 | 0b0: Sequence number field is present |
| IE Present | 1 | 0b1: Header IE and Payload IE are contained in the frame |
| Destination Addressing Mode | 2 | 0b00: Destination address field is not present 0b10: Destination address field contains short address 0b11: Destination address field contains extended address |
| Frame Version | 2 | 0b10: IEEE Std 802.15.4-2020 |
| Source Addressing Mode | 2 | 0b10: Source address field contains short address 0b11: Source address field contains extended address |

Referring to Table 5, frame control field may include at least one of frame type field, security enabled field, frame pending field, AR field, PAN ID compression field, reserved field, sequence number suppression field, IE Present field, destination addressing mode field, frame version field, or source addressing mode field.

According to an embodiment of the disclosure, for the Advertisement message, an example of the content field of the Payload IE may be shown in Table 6.

TABLE 6

| Parameter | Size (bits) | Notes |
|---|---|---|
| Vendor OUI | 24 | 0x5A18FF |
| UWB message ID | 4 | 0x7 = Advertisement Message |
| Class | 8 | A class of data format contained in Advertisement Data 0x00: RFU 0x01: URI as defined in RFC 3986 0x02: Media Types as defined in RFC 6838 0x03-0xFE: RFU 0xFF: Vendor-defined type |
| Advertisement Data Type Length | 8 | Length of Advertisement Data Type field (in octets) |
| Advertisement Data Type | Variable | If URI (0x01) is used, absolute URI as defined in [RFC 3986]. If Media Types (0x02) is used, media type as defined in [RFC 2046]. |
| Advertisement Data Length | 16 | Length of Advertisement Data field (in octets) |
| Advertisement Data | Variable | Data which of type corresponds to Type field |

Payload IE Content field may include at least one parameter/field (e.g., Vendor organizationally unique identifier (OUI), UWB message ID, Class, Advertisement Data Type Length, Advertisement Data Type, Advertisement Data Length, and/or Advertisement Data).

A Vendor OUI field is a 24-bit number that uniquely identifies a vendor.

UWB message ID field may indicate the type of message. In case that the UWB message ID field is set to 0x7, the UWB message is Advertisement message.

Advertisement Data Type Length field may indicate Length of Advertisement Data Type field (in octets).

Advertisement Data Type field may indicate a type of the advertisement data.

Advertisement Data Length field may indicate a length of Advertisement Data field (in octets).

Advertisement Data field may include data which of type corresponds to Type field (Advertisement Data Type field).

When Application Media Type is used, identifier of an application (AID) of the application can be used to specify the parameter value of the Advertisement Data Type. Additional suffix (e.g., "+json") to the Media Type can be used to represent the syntax of the Advertisement Data as defined in [RFC6839].

For example,

Class: 0x02

Advertisement Data Type Length: 46

Advertisement Data Type: application/vnd.com.example-.android.app_A+json

Advertisement Data Length: 137

Advertisement Data:

```
{
"precision": "zip",
"Latitude": 37.7668,
"Longitude": -122.3959,
"Address":
"City": "SAN FRANCISCO",
"State": "CA",
"Zip": "94107",
"Country": "US"
}
```

In an embodiment, AID is the identifier of an application to which the Advertisement Data will be delivered. The AID can be one of the followings:

Android Application Identifier as defined in Android Developer user guide iOS Application Identifier as defined in Apple Developer Documentation Observer executes the application mapped to Application Media Type, by using Advertisement Data as the parameters of the application. It is implementation dependent when the application mapped to Application Media Type does not exist on Observer. Observer may ask user to select the application to be executed or may launch a System Application (e.g., App Store, etc.) for users to download the application.

On Advertiser, the fields of the Advertisement Message are set via UCI.

For communicating advertisement message, UWB configuration parameters in Table 7 should be configured via UCI.

To set up a UWB Session, a set of UWB configuration parameters as listed in Table 7 are negotiated between UWB devices. For example, the Controlee may provide its capability for optional features and its MAC address, and the Controller determines and transmits the UWB configuration parameters to the Controlee. The UWB configuration parameters are configured to UWBS of the UWB device via UCI.

TABLE 7

| Parameter | Notes |
| --- | --- |
| Session ID | Identifier for UWB session, this is a 32 bit integer number transmitted as part of Header IE. |
| Ranging Method | Supported Ranging round usage are: . . . Advertising and Observing Mode |
| Device Role | Role of the device: . . . Transmitter Receiver |
| Device Type | Type of device: . . . Advertiser Observer |
| RFRAME Configuration | |
| ToF Report | |
| AoA Azimuth Report | |
| AoA Elevation Report | |
| AoA FOM Report | |
| Round Hopping | |
| Block Striding | |
| Block Duration | |
| Round Duration | |
| Slot Duration | |
| Channel Number | |
| Preamble Code Index | |
| PRF Mode | |
| SP0 PHY Set# | |
| SP1 PHY Set# | |
| SP3 PHY Set# | |
| Max RR Retry | |
| Constraint Length of Convolutional Code | |
| UWB Initiation Time | |
| Block Timing Stability | |
| Key Rotation | |
| Key Rotation Rate | |
| MAC FCS Type | |
| MAC Address Mode | |
| Device MAC Address | |
| Number of Controlees | |
| DST MAC Addresses | |
| STS Config | The MAC security feature allows applications to configure the STS generation methods and the possible configurations are: Fixed STS . . . |

Referring to Table 7, UWB configuration parameters may include at least one of Session ID, Ranging Method, Device Role, Device Type, RFRAME Configuration, ToF Report, AoA Azimuth Report, AoA Elevation Report, AoA FOM Report, Round Hopping, Block Striding, Block Duration, Round Duration, Slot Duration, Channel Number, Preamble Code Index, PRF Mode, SP0 PHY Set #, SP1 PHY Set #, SP3 PHY Set #, Max RR Retry, Constraint Length of Convolutional Code, UWB Initiation Time, Block Timing Stability, Key Rotation, Key Rotation Rate, MAC FCS Type, MAC Address Mode, Device MAC Address, Number of Controlees, DST MAC Addresses, or STS ConFIG.

For communicating advertisement message, the ranging method may include Advertising and observing mode, the device role may include transmitter and receiver, the device type may include Advertiser and Observer, and the STS config may include Fixed STS. The transmitter is device that transmits a data frame and the receiver is a Device that receives a RFRAME or data frame.

Hereinafter, various embodiments of UCI for UWB advertisement are described. As described above, UCI may be used for interfacing between UWBS and the UWB framework (or host). For example, UCI may be used in UWBS and UWB frameworks for UWB session management (e.g., establishment of a ranging session).

For establishing UWB session control messages are required. The control message(s) is required to start/stop the UWB session. The Session State shall be in SESSION_STATE_IDLE before starting the session. The Host UWBS shall generate the ranging results (RANGE_DATA_NTF) notification when Session State is in SESSION_STATE_ACTIVE.

While the UWB session is ongoing, the UWBS shall send ranging result with the RANGE_DATA_NTF notification (or ranging data notification) to the Host (or, framework). The Ranging data payload may be shown in Table 8.

TABLE 8

RANGE_DATA_NTF

| Payload Field(s) | Length | Value/Description |
|---|---|---|
| Sequence Number | 4 Octets | |
| Session ID | 4 Octets | |
| RCR Indication | 1 Octet | |
| Current Ranging Interval | 4 Octets | |
| Ranging Measurement Type | 1 Octet | 0x00: RFD<br>0x01: Two Way Ranging Measurement (SS-TWR, DS-TWR)<br>0x02: Downlink TDoA<br>0x03: Advertising and Observing Measurement |
| RFU | 1 Octet | |
| MAC Addressing Mode Indicator | 1 Octet | |
| RFU | 8 Octets | |
| Number of Ranging Measurements | 1 Octet | M: Number of ranging measurements to follow.<br>M = 1 for "Single device to Single device" (Controller/Controlee)<br>M = N for Multicast DS-TWR with N Controlees<br>M = (0 <= N) Downlink TDoA measurements in a given Ranging Round. The value of 0 indicates that there is no valid Downlink TDoA Measurement<br>M = 1(or K) for Advertising and Observing measurements |
| Ranging Measurements | M*ranging meas. Size | Advertisement & Observing Measurement Result |

Referring to Table 8, the ranging data notification may include sequence number field, session ID field, RCR indication field, current ranging interval field, ranging measurement type field, MAC addressing mode indicator field, number of ranging measurements field, and/or ranging measurements field (ranging measurement result field). In an embodiment, a plurality of advertising and observing measurement results of Table 9 may be included in the Ranging Measurement field according to the number of UWB messages transmitted by the advertiser in one ranging round.

If the measurement type field may include 0x03: advertising and observing measurement, Advertising and observing, and AoA measurement is allowed. The number of ranging measurements field may include the Advertising and Observing measurements.

The advertising and observing measurement result of the Ranging Measurements field may include a Payload field as shown in Table 9. A plurality of advertising and observing measurement results of Table 9 may be included in the Ranging Measurement field according to the number of UWB messages transmitted by the advertiser in one ranging round.

TABLE 9

Advertisement & Observing Measurement

| Payload Field(s) | Length | Value/Description |
|---|---|---|
| MAC address | 2/8 Octets | Short address of the participating device 2 Octets short address if MAC addressing mode indicator = 0x00. 8 Octets extended address if MAC addressing mode indicator = 0x01 |
| Status | 1 Octet | For various status values refer Table 32. If status field is other than STATUS_OK, then all other values except for MAC address shall be ignored |
| NLoS | 1 Octet | Indicates if the ranging measurement was in Line of sight or non-line of sight.<br>0x00 = LoS<br>0x01 = NLoS<br>0x02 to 0xEF = RFU<br>0xFF = Unable to determine |
| AoA Azimuth | 2 Octets | AoA Azimuth in degrees and it is a signed value in Q9.7 format This field is zero if AOA_RESULT_REQ = 0. |
| AoA Azimuth FOM | 1 Octet | The AoA Azimuth FOM field conveys the reliability of the estimated AOA Azimuth. FOM goes from 0 to 100. Higher values indicate better quality AoA estimates. Lower values suggest decreased reliability in the estimates. |
| AoA Elevation | 2 Octets | AoA Elevation in degrees and it is a signed value in Q9.7 format. This field is zero if AOA_RESULT_REQ = 0. |
| AoA Elevation FOM | 1 Octet | The AoA Elevation FOM field conveys the reliability of the estimated AOA Elevation. FOM goes from 0 to 100. Higher values indicate better quality AoA estimates. Lower values suggest decreased reliability in the estimates. |
| Advertisement Data Type length | 1 Octets | Length of Advertisement Data Type field (in octets) |
| Advertisement Data Type | Variable (as specified in Advertisement Data Type length) | Type of data format contained in Advertisement Data |
| Advertisement Data length | 2 Octets | Length of Advertisement Data field (in octets) |
| Advertisement Data | Variable (as specified in Advertisement Data length) | Data which of type corresponds to Advertisement Data Type field |

Referring to Table 9, the Advertisement & Observing Measurement may include at least one of MAC address field, status field, non-line of sight (NLoS) field, angle-of-arrival (AoA) Azimuth field, AoA Azimuth FOM field, AoA elevation field, AoA elevation FOM field, Advertisement Data Type length field, Advertisement Data Type field, Advertisement Data length field, or Advertisement Data field.

The MAC address may indicate short address of the participating device. NLoS field may indicate if the ranging measurement was in Line of sight or non-line of sight. The AoA Azimuth field may indicate the Azimuth in degrees. The AoA elevation field may indicate the elevation in degrees. Advertisement Data Type length field may indicate Length of Advertisement Data Type field (in octets). Advertisement Data Type field may indicate type of data format contained in Advertisement Data. Advertisement Data length field may indicate Length of Advertisement Data field (in octets). Advertisement Data field may indicate Data which of type corresponds to Advertisement Data Type field.

For configuring advertisement data of the Advertisement message for the advertiser, the command (e.g., SET_ADVERTISEMENT_DATA_CMD) of Table 10 shall be used for Advertiser to set data to be contained in Advertisement Message.

TABLE 10

SET_ADVERTISEMENT_DATA_CMD

| Payload Field(s) | Length | Value/Description |
|---|---|---|
| Advertisement Data Type length | 1 Octets | Length of Advertisement Data Type field (in octets) |
| Advertisement Data Type | Variable (as specified in Advertisement Data Type length) | Type of data format contained in Advertisement Data |

TABLE 10-continued

SET_ADVERTISEMENT_DATA_CMD

| Payload Field(s) | Length | Value/Description |
|---|---|---|
| Advertisement Data length | 2 Octets | Length of Advertisement payload field (in octets) |
| Advertisement Data | Variable (as specified in Advertisement Data length) | Data which of type corresponds to Advertisement Data Type field |

Referring to Table 10, The SET_ADVERTISEMENT_DATA_CMD may include at least one of Advertisement Data Type length field, Advertisement Data Type field, Advertisement Data length field, or Advertisement Data field. The Advertisement Data Type length field may indicate Length of Advertisement Data Type field (in octets). The Advertisement Data Type field may indicate Type of data format contained in Advertisement Data. The Advertisement Data length field may indicate Length of Advertisement payload field (in octets). The Advertisement Data field may indicate Data which of type corresponds to Advertisement Data Type field. The advertiser may set data of the advertisement message based on the command.

The UWB device may set an application configuration to configure a session. The host (or FRAMEWORK or UWBS) of the UWB device may use the SESSION_SET_APP_CONFIG_CMD command to set the application configuration. The Host may set the application configuration parameter through the control message.

For the Application configuration, parameters as shown in Table 11 may be included.

TABLE 11

| Parameter Name (*): Can be applied during session active state as well | Length (Octets) | Tag (IDs) | Description Note: unassigned values are reserved for future use | Advertiser | Mobile node |
|---|---|---|---|---|---|
| DEVICE_TYPE | 1 | 0x00 | 0x00 = Controlee 0x01 = Controller 0x02 = Advertiser 0x03 = Observer Values 0x04 to 0xFF = RFU | 0x02 | 0x03 |
| RANGING_ROUND_USAGE | 1 | 0x01 | 0x00 = RFU 0x01 = SS-TWR with Deferred Mode 0x02 = DS-TWR with Deferred Mode (default) 0x03 = SS-TWR with Non-deferred Mode 0x04 = DS-TWR with Non-deferred Mode Values 0x05 = Downlink TDOA 0x06 = Advertising and Observing Mode Values 0x07 to 0xFF = RFU | 0x06 | 0x06 |
| STS_CONFIG | 1 | 0x02 | This parameter indicates how system shall generate the STS. 0x00 = Static STS (default) 0x01 = Dynamic STS 0x02 = Dynamic STS for Controlee individual Key 0x03 = Fixed STS Vallies 0x04 to 0xFF = RFU | 0x03 | 0x03 |
| MULTI_NODE_MODE | 1 | 0x03 | | | |
| CHANNEL_NUMBER | 1 | 0x04 | | | |
| NUMBER_OF_CONTROLEES | 1 | 0x05 | | | |
| DEVICE_MAC_ADDLESS | 2/8 | 0x06 | | | |
| DST_MAC_ADDRESS | 2/8* | 0x07 N | | | |

TABLE 11-continued

| Parameter Name (*): Can be applied during session active state as well | Length (Octets) | Tag (IDs) | Description Note: unassigned values are reserved for future use | Advertiser | Mobile node |
|---|---|---|---|---|---|
| SLOT_DURATION | 2 | 0x08 | Unsigned integer that specifies duration of a ranging slot in the unit of RSTU (default = 2400) In case of Advertisement, this parameter is used for configuring the time window for random delay. Note. the interval of advertisement message transmission is defined as RANING_INTERVAL + [0, SLOT_DURATION] | 2400 | NA |
| RANGING_INTERVAL (*) | 4 | 0x09 | Ranging interval in the unit of 1200 RSTU which is 1 ms between beginning of one ranging round to the beginning of the next. Minimum Ranging interval should be at least the duration of one ranging round length. Mapping of ranging interval can be referred in section 7.5.1.1 (default = 200) In case of block based ranging this parameter is used for configuring block duration In case of Advertisement, this parameter is used for configuring the fixed duration of interval between advertisement messages Note. the interval of advertisement message transmission is defined as RANING_INTERVAL+ [0, SLOT_DURATION] | 200 | NA |
| STS_INDEX | 4 | 0x0A | | | |
| MAC_FCS_TYPE | 1 | 0x0B | | | |
| RANGING_ROUND_CONTROL | 1 | 0x0C | | | |
| AOA_RESULT_REQ | 1 | 0x0D | | | |
| RANGE_DATA_NTF_CONFIG (*) | 1 | 0x0E | | | |
| RANGE_DATA_NTF_PROXIMITY_NEAR (*) | 2 | 0x0F | | | |
| RANGE_DATA_NTF_PROXIMITY_FAR (*) | 2 | 0x10 | | | |
| DEVICE_ROLE | 1 | 0x11 | 0x00 = Responder 0x01 = Initiator 0x02: Initiator & Responder 0x03 : Receiver 0x04 : Transmitter 0x05 = Advertiser 0x06 = Observer Values 0x07 to 0xFF = RFU | 0x04 | 0x03 |
| RFRAME_CONFIG | 1 | 0x12 | | | |
| PREAMBLE_CODE_INDEX | 1 | 0x14 | | | |
| SFD_ID | 1 | 0x15 | | | |
| PSDU_DATA_RATE | 1 | 0x16 | | | |
| PREAMBLE_DURATION | 1 | 0x17 | | | |
| RANGING_TIME_STRUCT | 1 | 0x1A | | | |
| SLOTS_PER_RR | 1 | 0x1B | | | |
| TX_ADAPTIVE_PAYLOAD_POWER | 1 | 0x1C | | | |
| RESPONDER_SLOT_INDEX | 1 | 0x1E | | | |
| PRF_MODE | 1 | 0x1F | | | |
| SCHEDULED_MODE | 1 | 0x22 | | | |
| KEY_ROTATION | 1 | 0x23 | | | |
| KEY_ROTATION_RATE | 1 | 0x24 | | | |
| SESSION_PRIORITY | 1 | 0x25 | | | |
| MAC_ADDRESS_MODE | 1 | 0x26 | | | |
| VENDOR_ID | 2 | 0x27 | | | |
| STATIC_STS_IV | 6 | 0x28 | | | |
| NUMBER_OF_STS_SEGMENTS | 1 | 0x29 | | | |
| MAX_RR_RETRY | 2 | 0x2A | | | |
| UWB_INITIATION_TIME | 4 | 0x2B | | | |
| HOPPING_MODE | 1 | 0x2C | | | |

TABLE 11-continued

| Parameter Name (*): Can be applied during session active state as well | Length (Octets) | Tag (IDs) | Description Note: unassigned values are reserved for future use | Advertiser | Mobile node |
|---|---|---|---|---|---|
| BLOCK_STRIDING | 1 | 0x2D | | | |
| RESULT_REPORT_CONFIG | 1 | 0x2E | | | |
| IN_BAND_TERMINATION_ATTEMPT_COUNT | 1 | 0x2F | | | |
| SUB_SESSION_ID | 4 | 0x30 | | | |
| BPRF_PHR_DATA_RATE | 1 | 0x31 | | | |
| MAX_NUMBER_OF_MEASUREMENTS | 2 | 0x32 | | | |
| STS_LENGTH | 1 | 0x35 | | | |
| RFU | | 0x13 | | | |
| | | 0x18 | | | |
| | | 0x19 | | | |
| | | 0x1D | | | |
| | | 0x20 | | | |
| | | 0x21 | | | |
| | | 0x35-0x9F | | | |
| Reserved for Vendor Specific | | 0xA0-DF | | | |
| Reserved for extension of IDs | | | | | |
| ID is 2 Octets in length | | 0xE0-0xE2 | ID is 2 Octets in length. Refer section 8.1 for details | | |
| Reserved for Vendor Specific Use | | | | | |
| Vendor Specific App Configs | | 0xE3-0xFF | Vendor Specific ID space | | |

Referring to Table 11, the application configuration parameters may include at least one of DEVICE_TYPE, RANGING_ROUND_USAGE, STS_CONFIG, MULTI_NODE_MODE, CHANNEL_NUMBER, NUMBER_OF_CONTROLEES, DEVICE_MAC_ADDRESS, DST_MAC_ADDRESS, SLOT_DURATION, RANGING_INTERVAL (*), STS_INDEX, MAC_FCS_TYPE, RANGING_ROUND_CONTROL, AOA_RESULT_REQ, RANGE_DATA_NTF_CONFIG (*), RANGE_DATA_NTF_PROXIMITY_NEAR (*), RANGE_DATA_NTF_PROXIMITY_FAR (*), DEVICE_ROLE, RFRAME_CONFIG, PREAMBLE_CODE_INDEX, SFD_ID, PSDU_DATA_RATE, PREAMBLE_DURATION, RANGING_TIME_STRUCT, SLOTS_PER_RR, TX_ADAPTIVE_PAYLOAD_POWER, RESPONDER_SLOT_INDEX, PRF_MODE, SCHEDULED_MODE, KEY_ROTATION, KEY_ROTATION_RATE, SESSION_PRIORITY, MAC_ADDRESS_MODE, VENDOR_D, STATIC_STS_IV, NUMBER_OF_STS_SEGMENTS, MAX_RR_RETRY, UWB_INITIATION_TIME, HOPPING_MODE, BLOCK_STRIDING, RESULT_REPORT_CONFIG, IN_BAND_TERMINATION_ATTEMPT_COUNT, SUB_SESSION_ID, BPRF_PHR_DATA_RATE, MAX_NUMBER_OF_MEASUREMENTS, STS_LENGTH, RFU, Reserved for Vendor Specific, ID is 2 Octets in length, or Vendor Specific App ConFIGS.

Figure 4:
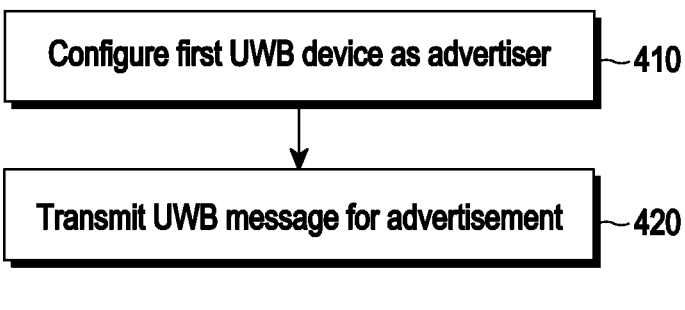
FIG. 4 is a flowchart illustrating an operation for providing an advertisement by a UWB device according to an embodiment of the disclosure.

FIG. 4 is a flowchart illustrating an operation for providing an advertisement by a UWB device according to an embodiment of the disclosure.

The operations of the flowchart illustrated in FIG. 4 may be performed by a UWB device (or the first UWB device) or an advertiser device of the disclosure.

The UWB device may configure the UWB device as an advertiser (410). In order for the UWB device to be configured as an advertiser, the UWB configuration of Table 7 or the application configuration of Table 11 of the disclosure may be received or configured based thereon.

The UWB device may transmit (or broadcast) a UWB message for advertisement (420). The UWB message may include at least one of a class field indicating a class of a data format included in an advertisement data field, a data type length field indicating a length of an advertisement data type field, the advertisement data type field indicating a type of advertise data, an advertisement data length field indicating a length of an advertisement data field, or the advertisement data field including the advertise data. The UWB message may be used for measuring an AoA. The UWB message may include fields according to Table 6.

In an embodiment, a UWB subsystem of a second UWB device receiving the UWB message may transfer a notification related to a ranging measurement based on the UWB message to a UWB framework of the second UWB device via UWB command interface (UCI). The notification may include a ranging measurement type field indicating a type of the ranging measurement and a ranging measurement result depending on the type of the ranging measurement.

In an embodiment, the second UWB device may be configured as an observer.

In an embodiment, the ranging measurement type field may be set to a value indicating a type for AoA measurement of the observer.

In an embodiment, the ranging measurement result may include at least one of a non-line of sight (NLoS) field indicating whether the ranging measurement is in line of sight (LoS) or non-line of sight, an AoA azimuth field indicating an AoA azimuth, an AoA azimuth figure of merit (FOM) field indicating a reliability of the AoA azimuth in the AoA azimuth field, an AoA elevation field indicating an AoA elevation, or an AoA elevation figure of merit (FOM) field indicating a reliability of the AoA elevation in the AoA elevation field.

Figure 5:
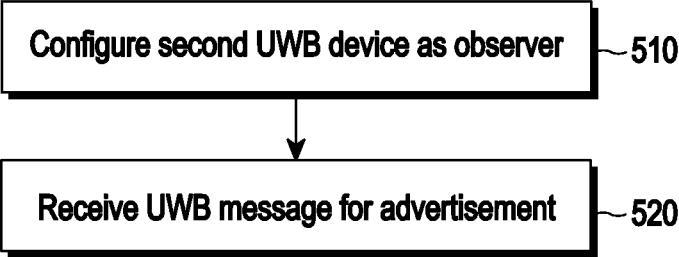
FIG. 5 is a flowchart illustrating an operation for receiving an advertisement by a UWB device according to an embodiment of the disclosure.

FIG. 5 is a flowchart illustrating an operation for receiving an advertisement by a UWB device according to an embodiment of the disclosure.

The operations of the flowchart illustrated in FIG. 5 may be performed by a UWB device (or the second UWB device) or an observer device of the disclosure.

The UWB device may configure the UWB device as an observer (510). In order for the UWB device to be configured as an observer, the UWB configuration of Table 7 or the application configuration of Table 11 of the disclosure may be received or configured based thereon.

The UWB device may receive a UWB message for advertisement (520) from other UWB device. The UWB message may include at least one of a class field indicating a class of a data format included in an advertisement data field, a data type length field indicating a length of an advertisement data type field, the advertisement data type field indicating a type of advertise data, an advertisement data length field indicating a length of an advertisement data field, or the advertisement data field including the advertise data. The UWB message may be used for measuring an AoA.

In an embodiment, a UWB subsystem of the UWB device receiving the UWB message may transfer a notification related to a ranging measurement based on the UWB message to a UWB framework of the UWB device via UWB command interface (UCI). The notification may include a ranging measurement type field indicating a type of the ranging measurement and a ranging measurement result depending on the type of the ranging measurement.

In an embodiment, the other UWB device may be configured as an advertiser.

In an embodiment, the ranging measurement type field may be set to a value indicating a type for AoA measurement of the observer.

In an embodiment, the ranging measurement result may include at least one of a non-line of sight (NLoS) field indicating whether the ranging measurement is in line of sight (LoS) or non-line of sight, an AoA azimuth field indicating an AoA azimuth, an AoA azimuth figure of merit (FOM) field indicating a reliability of the AoA azimuth in the AoA azimuth field, an AoA elevation field indicating an AoA elevation, or an AoA elevation FOM field indicating a reliability of the AoA elevation in the AoA elevation field.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first ultra-wideband (UWB) device in a wireless communication, the method comprising:
    receiving, by a UWB subsystem (UWBS) of the first UWB device from a host of the first UWB device, a first UWB command interface (UCI) message including UWB configuration information for an application, wherein the UWB configuration information for the application includes ranging round usage information indicating one way ranging (OWR) for angle of arrival (AoA) measurement, and device role information indicating an advertiser that transmits a UWB message of the OWR for the AoA measurement; and
    transmitting, to a second UWB device configured as an observer, the UWB message of the OWR for the AoA measurement using UWB communication based on the UWB configuration information, wherein the UWB message of the OWR for the AoA measurement includes:
    a class field indicating a class of a data format included in an advertisement data field,
    a data type length field indicating a length of an advertisement data type field,
    the advertisement data type field indicating a type of advertise data,
    an advertisement data length field indicating a length of the advertisement data field, and
    the advertisement data field including the advertise data.

2. The method of claim 1,
    wherein the UWB message is used for transferring a second UCI message for a notification related to the AoA measurement by a UWBS of the second UWB device, and
    wherein the second UCI message for the notification includes a ranging measurement type field including a value indicating the AoA measurement and a ranging measurement result corresponding to the value included in the ranging measurement type field.

3. The method of claim 2, wherein the ranging measurement result includes at least one of:
    a non-line of sight (NLoS) field indicating whether the ranging measurement is in line of sight (LoS) or non-line of sight,
    an AoA azimuth field indicating an AoA azimuth,
    an AoA azimuth figure of merit (FOM) field indicating a reliability of the AoA azimuth in the AoA azimuth field,
    an AoA elevation field indicating an AoA elevation, or
    an AoA elevation FOM field indicating a reliability of the AoA elevation in the AoA elevation field.

4. A method performed by a second ultra-wideband (UWB) device in a wireless communication, the method comprising:
    receiving, by a UWB subsystem (UWBS) of the second UWB device from a host of the second UWB device, a first UWB command interface (UCI) message including UWB configuration information for an application, wherein the UWB configuration information for the application includes ranging round usage information indicating one way ranging (OWR) for angle of arrival (AoA) measurement, and device role information indicating an observer that receives a UWB message of the OWR for the AoA measurement; and
    receiving, from a first UWB device configured as an advertiser, the UWB message of the OWR for the AoA measurement using UWB communication based on the UWB configuration information,
    wherein the UWB message of the OWR for the AoA measurement includes:
    a class field indicating a class of a data format included in an advertisement data field,
    a data type length field indicating a length of an advertisement data type field,
    the advertisement data type field indicating a type of advertise data,
    an advertisement data length field indicating a length of the advertisement data field, and
    the advertisement data field including the advertise data.

5. The method of claim 4, further comprising:
    transferring, by the UWBS of the second UWB device, a second UCI message for a notification related to the AoA measurement based on the UWB message, and
    wherein the second UCI message for the notification includes a ranging measurement type field including a value indicating the AoA measurement and a ranging measurement result corresponding to the value included in the ranging measurement type field.

6. The method of claim 5, wherein the ranging measurement result includes at least one of:

a non-line of sight (NLoS) field indicating whether the ranging measurement is in line of sight (LoS) or non-line of sight, an AoA azimuth field indicating an AoA azimuth, an AoA azimuth figure of merit (FOM) field indicating a reliability of the AoA azimuth in the AoA azimuth field, an AoA elevation field indicating an AoA elevation, or an AoA elevation FOM field indicating a reliability of the AoA elevation in the AoA elevation field.

7. A first ultra-wideband (UWB) device in a wireless communication, the first UWB device comprising:

a transceiver; and at least one processor coupled with the transceiver, wherein the at least one processor is configured to:

receive, by a UWB subsystem (UWBS) of the first UWB device from a host of the first UWB device, a first UWB command interface (UCI) message including UWB configuration information for an application, wherein the UWB configuration information for the application includes ranging round usage information indicating one way ranging (OWR) for angle of arrival (AoA) measurement, and device role information indicating an advertiser that transmits a UWB message of the OWR for the AoA measurement, and transmit, to a second UWB device configured as an observer, the UWB message of the OWR for the AoA measurement using UWB communication based on the UWB configuration information, and wherein the UWB message of the OWR for the AoA measurement includes:

a class field indicating a class of a data format included in an advertisement data field, a data type length field indicating a length of an advertisement data type field, the advertisement data type field indicating a type of advertise data, an advertisement data length field indicating a length of the advertisement data field, and the advertisement data field including the advertise data.

8. The first UWB device of claim 7, wherein the UWB message is used for transferring a second UCI message for a notification related to the AoA measurement by a UWBS of the second UWB device, and wherein the second UCI message for the notification includes a ranging measurement type field including a value indicating the AoA measurement and a ranging measurement result corresponding to the value included in the ranging measurement type field.

9. The first UWB device of claim 8, wherein the ranging measurement result includes at least one of:

a non-line of sight (NLoS) field indicating whether the ranging measurement is in line of sight (LoS) or non-line of sight, an AoA azimuth field indicating an AoA azimuth, an AoA azimuth figure of merit (FOM) field indicating a reliability of the AoA azimuth in the AoA azimuth field, an AoA elevation field indicating an AoA elevation, or an AoA elevation FOM field indicating a reliability of the AoA elevation in the AoA elevation field.

10. A second ultra-wideband (UWB) device in a wireless communication, the second UWB device comprising:

a transceiver; and at least one processor coupled with the transceiver, wherein the at least one processor is configured to:

receive, by a UWB subsystem (UWBS) of the second UWB device from a host of the second UWB device, a first UWB command interface (UCI) message including UWB configuration information for an application, wherein the UWB configuration information for the application includes ranging round usage information indicating one way ranging (OWR) for angle of arrival (AoA) measurement, and device role information indicating an observer that receives a UWB message of the OWR for the AoA measurement, and receive, from a first UWB device configured as an advertiser, the UWB message of the OWR for the AoA measurement using UWB communication based on the UWB configuration information, and wherein the UWB message of the OWR for the AoA measurement includes:

a class field indicating a class of a data format included in an advertisement data field, a data type length field indicating a length of an advertisement data type field, the advertisement data type field indicating a type of advertise data, an advertisement data length field indicating a length of the advertisement data field, and the advertisement data field including the advertise data.

11. The second UWB device of claim 10, wherein the at least one processor is further configured to:

transfer, by the UWBS of the second UWB device, a second UCI message for a notification related to the AoA measurement based on the UWB message, and wherein the second UCI message for the notification includes a ranging measurement type field including a value indicating the AoA measurement and a ranging measurement result corresponding to the value included in the ranging measurement type field.

12. The second UWB device of claim 11, wherein the ranging measurement result includes at least one of:

a non-line of sight (NLoS) field indicating whether the ranging measurement is in line of sight (LoS) or non-line of sight, an AoA azimuth field indicating an AoA azimuth, an AoA azimuth figure of merit (FOM) field indicating a reliability of the AoA azimuth in the AoA azimuth field, an AoA elevation field indicating an AoA elevation, or an AoA elevation FOM field indicating a reliability of the AoA elevation in the AoA elevation field.

* * * * *